(12) United States Patent
Jonsson et al.

(10) Patent No.: US 7,344,008 B1
(45) Date of Patent: Mar. 18, 2008

(54) SHOCK ABSORBING BOX

(75) Inventors: Martin Jonsson, Lulea (SE); Johan Nilsson, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 592 days.

(21) Appl. No.: 10/048,701

(22) PCT Filed: May 2, 2000

(86) PCT No.: PCT/SE00/00830

§ 371 (c)(1),
(2), (4) Date: Oct. 19, 2001

(87) PCT Pub. No.: WO00/66400

PCT Pub. Date: Nov. 9, 2000

(30) Foreign Application Priority Data

May 3, 1999 (SE) .................................. 9901565

(51) Int. Cl.
*F16F 7/12* (2006.01)
(52) U.S. Cl. .................. 188/377; 188/371; 293/132
(58) Field of Classification Search ................ 188/371, 188/376, 377; 267/139; 293/132, 133, 102, 293/120
See application file for complete search history.

(56) References Cited

U.S. PATENT DOCUMENTS

| | | | |
|---|---|---|---|
| 3,511,345 A | 5/1970 | Takamatsu et al. | |
| 3,938,841 A * | 2/1976 | Glance et al. | 293/120 |
| 3,998,485 A | 12/1976 | Putter et al. | |
| 4,023,652 A | 5/1977 | Torke | |
| 5,080,410 A * | 1/1992 | Stewart et al. | 293/102 |
| 5,224,574 A * | 7/1993 | Thum | 188/371 |
| 5,340,178 A * | 8/1994 | Stewart et al. | 293/122 |
| 5,498,044 A * | 3/1996 | Bovellan et al. | 293/120 |
| 5,803,514 A * | 9/1998 | Shibuya et al. | 293/133 |
| 5,925,435 A * | 7/1999 | Togawa et al. | 296/153 |
| 6,000,738 A * | 12/1999 | Stewart et al. | 293/102 |
| 6,042,176 A * | 3/2000 | Ikeda et al. | 188/371 |
| 6,179,355 B1 * | 1/2001 | Chou et al. | 188/377 |
| 6,227,582 B1 * | 5/2001 | Ichien | 293/132 |
| 6,409,239 B1 * | 6/2002 | Tjoelker et al. | 188/376 |
| 6,474,709 B2 * | 11/2002 | Artner | 293/133 |
| 6,648,384 B2 | 11/2003 | Nees et al. | |

FOREIGN PATENT DOCUMENTS

| | | |
|---|---|---|
| DE | 4127381 | 9/1992 |
| DE | 4239460 | 5/1994 |
| DE | 19537186 | 4/1996 |

OTHER PUBLICATIONS

English translation of DE-19537186.*

* cited by examiner

*Primary Examiner*—Melody M. Burch
(74) *Attorney, Agent, or Firm*—Mark P. Stone

(57) ABSTRACT

Shock absorbing rectangular boxes (16, 17) are mounted between each one of two structural side beams (14, 15) of a vehicle and a bumper beam (11). The boxes are deep drawn from a steel sheet, and their sidewalls have deformation guides (35) so that the boxes are deformable in a controlled manner during a crash of the vehicle.

22 Claims, 3 Drawing Sheets

SHOCK ABSORBING BOX

TECHNICAL FIELD

This invention relates to a shock absorbing deep drawn rectangular open box between a bumper beam and a vehicle body, having a bottom, side walls and a flange.

BACKGROUND OF THE INVENTION AND PRIOR ART

Nowadays, bumper beams for passenger cars are usually adapted to absorb impact energy by being deformed plastically. In small cars, the beam can be arranged to absorb enough energy. In bigger cars, energy absorbing elements need to be arranged between the side beams of the car and the bumper beam. DE-19537186-A shows such elements in the form of deep drawn rectangular boxes. U.S. Pat. No. 3,998,485-A shows circular, stepped tubes as extensions of the side beams of a car.

OBJECT OF THE INVENTION

It is an object of the invention to provide a comparatively short shock absorbing element between a bumper beam and a vehicle body, which element will have a high energy absorption and a high and comparatively even resistance force while being deformed during a crash.

SUMMARY OF THE INVENTION

This object is fulfilled in principle in that the sides of an element in the form of an open deep drawn rectangular box with a side flange at its opening has different inclination of the part of its side walls adjacent the bottom and the part of its side walls adjacent the flange so that a deformation guide is formed between the two parts of each side wall of the box. To this end, the invention has been given the characteristics stated in the claims.

BRIEF DESCRIPTION OF THE DRAWINGS

The invention will be described with reference to the accompanying drawings which show a shock absorbing box as an example of the invention.

DESCRIPTION OF THE PREFERRED EMBODIMENTS

Figure 1:
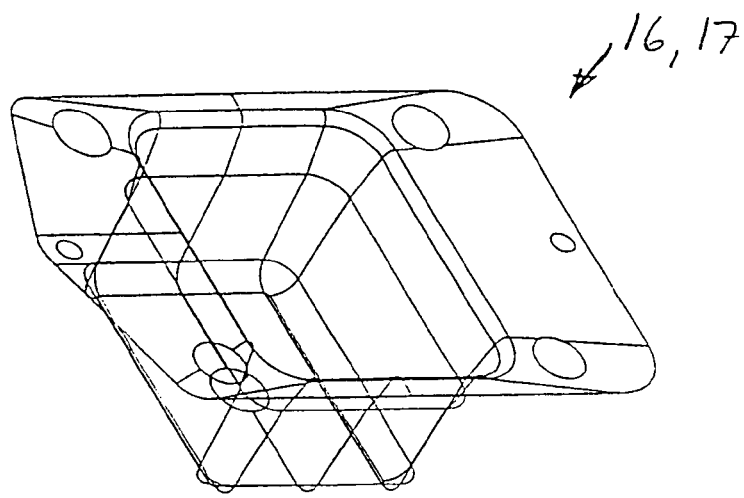
FIG. 1 is a transparent perspective view of the shock absorbing mounting box.
Figure 4:
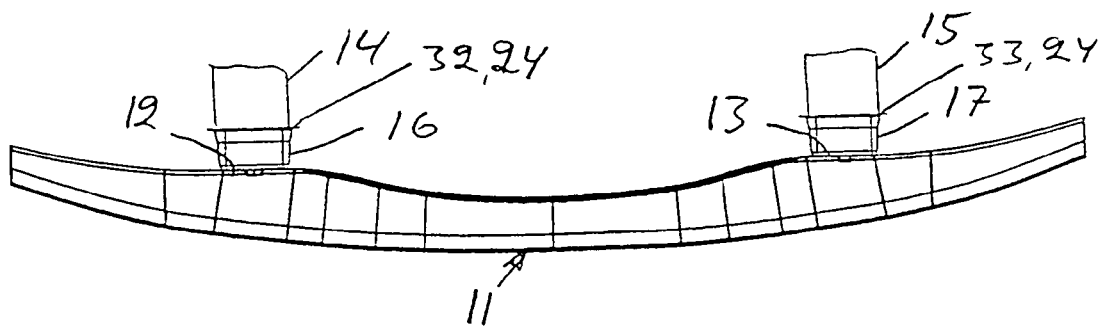
FIG. 4 is a top plan view of a bumper beam mounted to the side beams of a vehicle by means of mounting boxes of the kind shown in the FIGS. 1 and 2.
Figure 2:
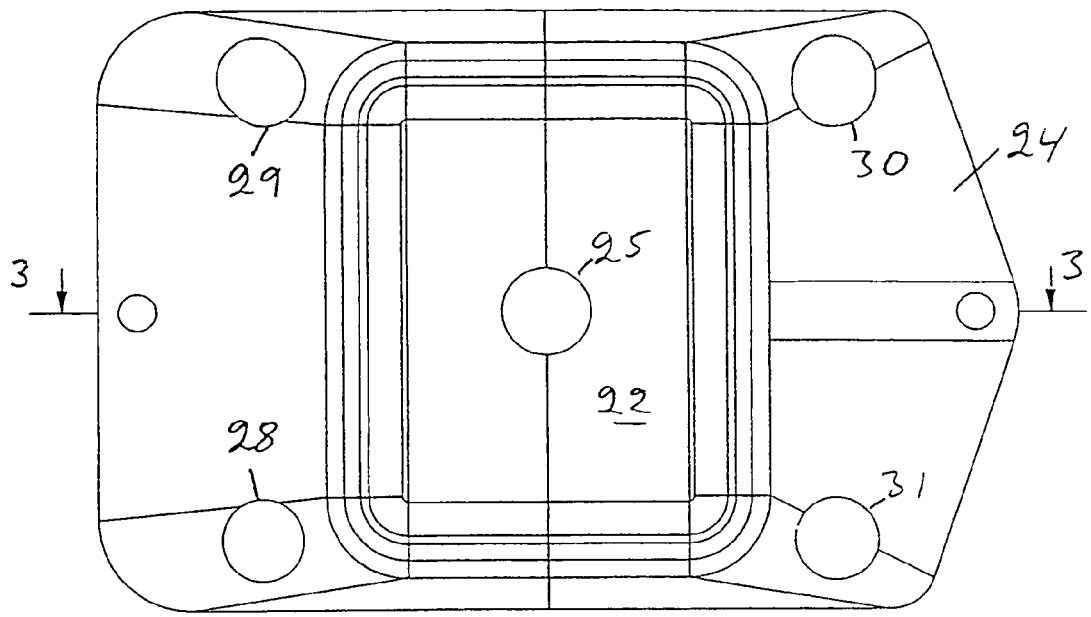
FIG. 2 is a view of the box shown in FIG. 1 seen as indicated by the arrows 2-2 in FIG. 3.
Figure 3:
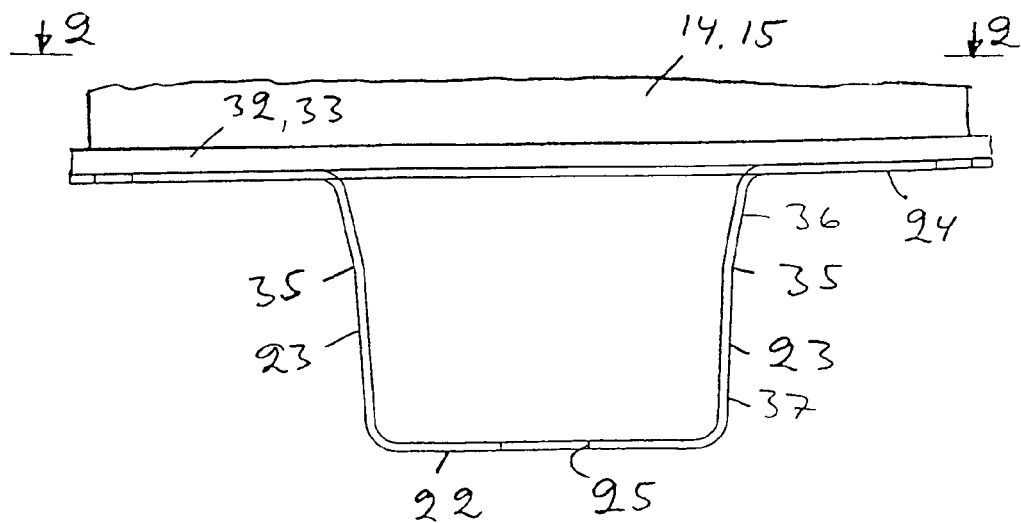
FIG. 3 is a section through the mounting element shown in FIGS. 1 and 2 and it is taken along the line 3-3 in FIG. 2.

In FIG. 4 is shown a bow-formed bumper beam of formed sheet steel. It has two flat mounting areas 12,13 adjacent the structural side beams 14,15 of the vehicle. Between the side beams 14,15 and the areas 12,13, there are two mounting elements 16,17 by the intermediate of which the bumper beam is mounted to the side beams. Such a mounting element is shown in the FIGS. 1-3. It comprises a box deep drawn from one piece of sheet steel and it has a bottom 22, four side walls 23 and a flange 24. The bottom 22 has a central hole 25 and the mounting areas 12,13 of the bumper beam have corresponding holes so that the boxes can be mounted to the bumper beam by means of screw and nut fasteners. The flange 24 of the boxes has four holes 28-31 and the ends of the side beams have flanges or plates 32,33 with corresponding holes so that the boxes 16,17 can be fastened to the side beams 14,15 by screw and nut fasteners. Suitably, the boxes can be deep drawn from high carbon cold forming steel so that they do not need to be hardened after the forming Such a hardening process could not be carried out without a fixture and would therefore be an expensive operation.

The boxes 16,17 are rectangular with rounded corners and they taper off slightly towards their bottoms. All four side walls 23 comprise a part 37 adjacent the bottom and a part 36 adjacent the flange and the two parts 36,37 have different inclination relative to the centerline of the box so that they form an obtuse angle in the line 35 in which they meet and the walls are thus concave. This line 35 between the two wall parts 36,37 form a guide for bending when the box is subjected to a load as will be described. The side wall part 36 adjacent the flange should preferably be shorter than the side wall part 37 adjacent the bottom and it could advantageously be less than ⅓ of the entire wall. The side wall parts 36,37 are preferably flat or substantially flat as shown.

At a car crash, the bumper beam 11 should be deformed first and then its mounting elements, that is, the boxes 16,17. Then, if the load is heavy, the load should be taken up by the side-beams 14,15. The lines 35 form guides for bending and the side walls 23 bend in these lines so that the parts 36 rotate inwards and upwards in FIG. 3 until they stop against the end plates of the side beams 14,15. The parts 37 of the side walls will then have a slight S-form and they are inclined inwards. The corners of the upper part 36 have folded in more than one fold. Then, the initial bend in line 35 will roll inwards toward the centre of the box and the corners will continue to fold in several folds. This pattern of movement is efficient as to the energy absorption because a great part of the material will be plastically deformed and thereby take up energy. The resistance force will have no spikes and will be comparatively constant during the entire deformation and it will not have a spike at the end of the elastic deformation before the plastic deformation starts. A curve of the resistance force related to the deformation will thus be comparatively flat which is desirable but difficult to achieve when the distance available for deformation is small.

In a box without the guides for bending 35, the resistance force before the plastic deformation would be much higher, but the total energy take-up much lower.

Figure 5:
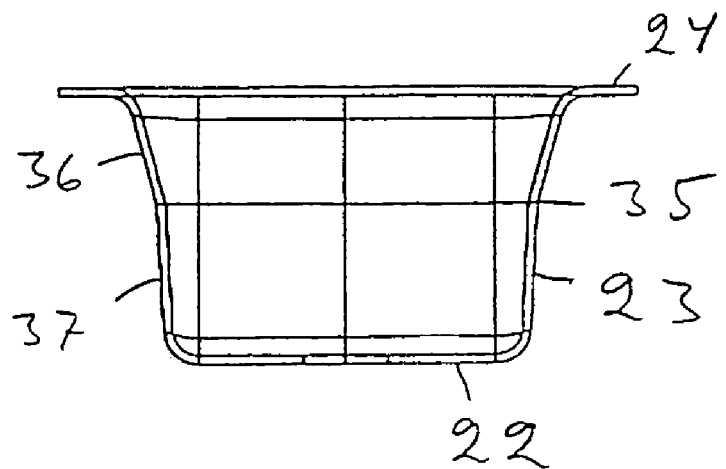
FIGS. 5 and 6 are two sections, at right angle to each other, through a somewhat modified design of the mounting box shown in FIGS. 3 and 4.
Figure 6:
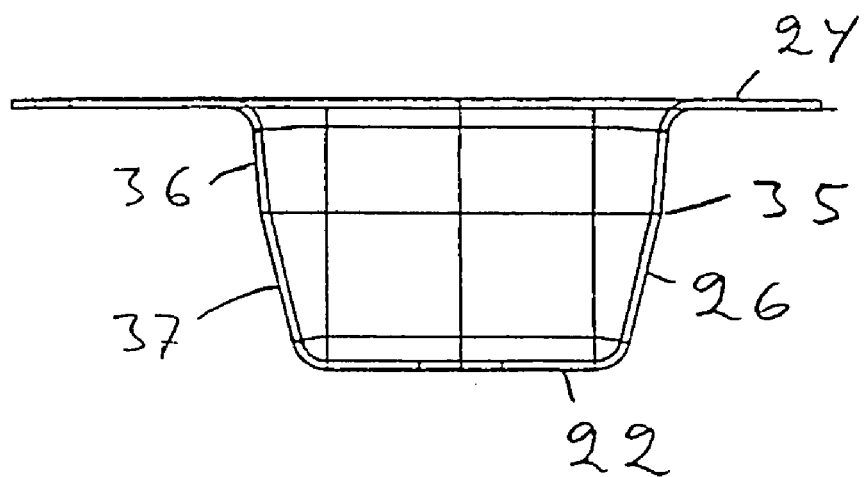

FIGS. 5 and 6 show a modified box. Two opposite side walls 23 are concave as can be seen in FIG. 5 but the other two side walls 26 are convex as can be seen in FIG. 6. This modified design provides for a still better total energy take-up, probably because a more efficient folding of the corners.

The invention claimed is:

1. A shock absorbing deep drawn rectangular open box between a bumper beam and a vehicle body, said box having a bottom (22), a flange (24), and a plurality of side walls (23, 26) extending between said flange and said bottom, said flange extending along a plane which is substantially parallel to a plane along which said bottom extends, characterised in that the side walls (23, 26) comprise one part (37) adjacent the bottom (22) and one part (36) adjacent the flange (24) and the two parts have different inclination so that a deformation guide (35) is formed between them, said deformation guide extending along a plane substantially parallel to the planes of the flange and the bottom.

2. A shock absorbing box according to claim 1, characterised in that said part (36) adjacent the flange (24) is shorter than said part (37) adjacent the bottom (22).

3. A shock absorbing box according to claim 1, characterised in that said box has four side walls comprising said two parts and all of said four side walls (23) are concave.

4. A shock absorbing box according to claim 1, characterised in that two opposite side walls (23) comprising said two parts are concave and the other two side walls (26) comprising said two parts are convex.

5. A shock absorbing box according to claim 1, characterised in that the flange (24) is fixed to the structural side beam (14, 15) of the vehicle body.

6. A shock absorbing box according to claim 5, characterised in that the flange (24) is fixed to an end plate (32, 33) of the side beam (14, 15).

7. A shock absorbing box according to claim 2, characterised in that said box has four side walls comprising said two parts and all of said four side walls (23) are concave.

8. A shock absorbing box according to claim 2, characterised in that two opposite side walls (23) comprising said two parts are concave and the other two side walls (26) comprising said two parts are convex.

9. A shock absorbing box according to claim 2, characterised in that the flange (24) is fixed to a structural side beam (14, 15) of the vehicle body.

10. A shock absorbing box according to claim 3, characterised in that the flange (24) is fixed to a structural side beam (14, 15) of the vehicle body.

11. A mounting element for mounting a bumper beam (11) to a vehicle, said mounting element comprising a deep drawn shock absorbing box formed as a single component, said shock absorbing box having a bottom (22), sides (23) extending from said bottom, and a flange (24) extending from the sides (23), said flange extending along a plane which is substantially parallel to a plane along which said bottom extends; said shock absorbing box being mountable to the bumper beam and the vehicle by mounting the bottom (22) to the vehicle and the flange (24) to the bumper beam, or by mounting the bottom (22) to the bumper beam and the flange (24) to the vehicle; wherein at least one of said sides (23) is formed from a first side portion (36) adjacent to said flange (24) and a second side portion (37) adjacent to said bottom (22), said first side portion being oriented at an angle relative to said second side portion to define a deformation guide (35) therebetween, said deformation guide extending along a plane substantially parallel to the planes of the flange and the bottom.

12. The shock absorbing box mounting element as claimed in claim 11, wherein said box has rounded corners at the portions thereof at which said sides (23) merge with said bottom (22).

13. The mounting element claimed in claim 11, wherein said bumper beam (11) is mounted by said mounting element to side beams (14, 15) of said vehicle.

14. The mounting element claimed in claim 11, wherein said deformation guide (35) is defined on said side (23) closer to said flange (24) than to said bottom (22).

15. The mounting element claimed in claim 14, wherein said deformation guide (35) is defined on said side (23) a distance away from said flange (24) which is not more than one third the length of said side (23).

16. The mounting element claimed in claim 14, wherein said shock absorbing box has four sides, and each of said four sides defines a deformation guide (35).

17. The mounting element claimed in claim 15, wherein said shock absorbing box has four sides, and each of said four sides defines a deformation guide (35).

18. The mounting element claimed in claim 16, wherein each of said four sides comprising said first and second side portions of said shock absorbing box is concave in shape as viewed from the outside of said box.

19. The mounting element claimed in claim 16, wherein two opposed said sides (23) comprising said first and second side portions of said shock absorbing box are concave when viewed from the outside of said box, and two opposed said sides (26) of said shock absorbing box comprising said first and second side portions are convex when viewed from the outside of said box.

20. The mounting element claimed in claim 13, wherein said flange (23) is mounted on an end plate or an end flange (32, 33) of said side beams (14, 15) of said vehicle.

21. A shock absorbing rectangular open box between a bumper beam and a vehicle body, said box having a bottom (22), a flange (24), and a plurality of side walls (23, 26) extending between said flange and said bottom, said flange extending along a plane which is substantially parallel to a plane along which said bottom extends, characterised in that the side walls (23, 26) comprise one part (37) adjacent the bottom (22) and one part (36) adjacent the flange (24) and the two parts have different inclination so that a deformation guide (35) is formed between them, said deformation guide extending along a plane substantially parallel to the planes of the flange and the bottom.

22. A mounting element for mounting a bumper beam (11) to a vehicle, said mounting element comprising a shock absorbing box formed as a single component, said shock absorbing box having a bottom (22), sides (23) extending from said bottom, and a flange (24) extending from the sides (23), said flange extending along a plane which is substantially parallel to a plane along which said bottom extends; said shock absorbing box being mountable to the bumper beam and the vehicle by mounting the bottom (22) to the vehicle and the flange (24) to the bumper beam, or by mounting the bottom (22) to the bumper beam and the flange (24) to the vehicle; wherein at least one of said sides (23) is formed from a first side portion (36) adjacent to said flange (24) and a second side portion (37) adjacent to said bottom (22), said first side portion being oriented at an angle relative to said second side portion to define a deformation guide (35) therebetween, said deformation guide extending along a plane substantially parallel to the planes of the flange and the bottom.

* * * * *